US012746672B2

(12) United States Patent
Zhang et al.

(10) Patent No.: US 12,746,672 B2
(45) Date of Patent: Sep. 29, 2026

(54) ROBOTIC ARM PATH PLANNING METHOD BASED ON DIRECTIONALLY EXTENDED RRT ALGORITHM

(71) Applicant: North China University of Technology, Beijing (CN)

(72) Inventors: Xiaoping Zhang, Beijing (CN); Jialin Zhang, Beijing (CN); Li Wang, Beijing (CN); Jing Wang, Beijing (CN); Honghai Ji, Beijing (CN); Shida Liu, Beijing (CN)

(73) Assignee: North China University of Technology, Beijing (CN)

( * ) Notice: Subject to any disclaimer, the term of this patent is extended or adjusted under 35 U.S.C. 154(b) by 9 days.

(21) Appl. No.: 19/020,556

(22) Filed: Jan. 14, 2025

(65) Prior Publication Data

US 2026/0054386 A1 Feb. 26, 2026

(30) Foreign Application Priority Data

Aug. 21, 2024 (CN) ........................ 202411150087.0

(51) Int. Cl.
*B25J 9/16* (2006.01)

(52) U.S. Cl.
CPC .................................. *B25J 9/1666* (2013.01)

(58) Field of Classification Search
USPC ........................................................ 700/255
See application file for complete search history.

(56) References Cited

U.S. PATENT DOCUMENTS

2024/0131706 A1* 4/2024 Sundaralingam ...... B25J 9/1664

FOREIGN PATENT DOCUMENTS

CN 116652932 A * 8/2023 ............ B25J 9/1666

* cited by examiner

*Primary Examiner* — Khoi H Tran
(74) *Attorney, Agent, or Firm* — JEEN IP LAW, LLC

(57) ABSTRACT

A robotic arm path planning method based on a Direction Extended Rapidly-exploring Random Tree (RRT) algorithm includes: determining a workspace of a robotic arm; determining a starting node and a target node based on the workspace, and performing modeling using an initialized random tree to obtain an obstacle space; generating a random node in the obstacle space, and setting a bias probability; determining whether a current random node collides with an obstacle; if yes, obtaining a new random node, until a currently generated random node does not collide with an obstacle; if not, determining whether the current random node is the target node; if the current random node is not the target node, continuing to generate new random nodes; if the current random node is the target node, obtaining an initial path; and optimizing the initial path to obtain a final path.

7 Claims, 12 Drawing Sheets

ROBOTIC ARM PATH PLANNING METHOD BASED ON DIRECTIONALLY EXTENDED RRT ALGORITHM

CROSS REFERENCE TO RELATED APPLICATION

This patent application claims the benefit and priority of Chinese Patent Application No. 2024111500870, filed with the China National Intellectual Property Administration on Aug. 21, 2024, the disclosure of which is incorporated by reference herein in its entirety as part of the present application.

TECHNICAL FIELD

The present disclosure relates to the technical field of robotic arm path planning, and in particular, to a robotic arm path planning method based on a Direction Extended Rapidly-exploring Random Tree (RRT) algorithm.

BACKGROUND

As a robot that mimics the movement of a human arm, a robotic arm can replace human hands in complex environments, thereby improving production efficiency and product quality. Currently, robotic arms are widely used in important fields such as aerospace, medical, and military applications. Path planning for robotic arms in complex spaces refers to the use of appropriate planning methods to automatically generate a path from a starting node to a target node, while satisfying the obstacle avoidance requirements of the end effector and links of the robotic arm in complex spaces.

In existing path planning technologies, designs are mainly categorized into the following three directions:

(1) Graph search-based algorithms, such as A* algorithm and Dijkstra's algorithm. These two algorithms can ensure the optimal path from the starting node to the target node. However, as the dimensions increase and the complexity of the scene grows, the time consumed for searching the path significantly increases.

(2) Biomimetic intelligent algorithms, such as ant colony algorithm, genetic algorithm, and particle swarm optimization algorithm. The genetic algorithm searches for paths by simulating the biological evolution process of natural selection, which can converge to an optimal value, but the convergence speed is low and computation time is long.

(3) Random sampling-based algorithms, such as (Probabilistic Roadmap) and RRT algorithms. These algorithms do not require prior mapping of obstacles from the task space to the configuration space, allowing for faster search speeds, making them more suitable for path planning in complex and high-dimensional spaces. However, the paths generated by these algorithms are only probabilistically complete and do not guarantee optimality.

SUMMARY

To overcome the shortcomings of the prior art, an objective of the present disclosure is to provide a robotic arm path planning method based on a directionally extended RRT algorithm. The present disclosure addresses issues in the prior art related to blind sampling nodes, excessive nodes, repeated sampling in space, and high time complexity in robotic arm path planning.

To achieve the above objective, the present disclosure provides the following technical solution:

A robotic arm path planning method based on a directionally extended RRT algorithm is provided, which includes:

determining a workspace of a robotic arm;

determining a starting node and a target node based on the workspace, and performing modeling using an initialized random tree to obtain an obstacle space, where the obstacle space includes a circular obstacle space and a rectangular obstacle space;

generating a random node in the obstacle space by using a target node sampling method, and setting a bias probability;

determining whether a current random node collides with an obstacle; if yes, adjusting a direction and a step length for subsequently generated random nodes based on the bias probability and a direction-based adaptive step length adjustment strategy to obtain a new random node, until a currently generated random node does not collide with an obstacle; if not, determining whether the current random node is the target node; if the current random node is not the target node, continuing to generate new random nodes; if the current random node is the target node, obtaining an initial path; and optimizing the initial path to obtain a final path.

Preferably, said determining the workspace of the robotic arm includes:

obtaining a transformation matrix based on working parameters of the robotic arm;

obtaining an end effector pose matrix based on the transformation matrix; and obtaining the workspace of the robotic arm by using a Monte Carlo method based on the end effector pose matrix.

Preferably, the working parameters include:

joint angles, joint distances, link lengths, and link relative rotation angles.

Preferably, a method for determining obstacle collisions in the circular obstacle space is a spherical envelope method.

Preferably, a method for determining obstacle collisions in the rectangular obstacle space is an axis-aligned bounding box method.

Preferably, said optimizing the initial path to obtain the final path includes:

deleting redundant nodes to obtain a relatively short path with a relatively small curvature and relatively few bends; and smoothing the currently generated path using a cubic B-spline curve to obtain the final path.

Preferably, a basis function of the B-spline curve is expressed as follows:

$$P(t) = \sum_{i=0}^{n} P_i F_{i,k}(t);$$

where $P_i$ represents a control point of a curve to be optimized, and F represents a k-th order B-spline basis function.

The present disclosure achieves the following technical effects:

The present disclosure provides a robotic arm path planning method based on a directionally extended RRT algorithm, which includes: determining a workspace of a robotic arm; determining a starting node and a target node based on the workspace, and performing modeling using an initialized random tree to obtain an obstacle space, where the obstacle space includes a circular obstacle space and a rectangular obstacle space; generating a random node in the obstacle space by using a target node sampling method, and setting a bias probability; determining whether a current random node collides with an obstacle; if yes, adjusting a direction and a step length for subsequently generated random nodes based on the bias probability and a direction-based adaptive step length adjustment strategy to obtain a new random node, until a currently generated random node does not collide with an obstacle; if not, determining whether the current random node is the target node; if the current random node is not the target node, continuing to generate new random nodes; if the current random node is the target node, obtaining an initial path; and optimizing the initial path to obtain a final path. By designing a spherical dynamic sampling area, a spatial range for generating new nodes is adaptively selected; introducing a target bias method during new node generation allows nodes to quickly converge towards the target node. The directionally-extended adaptive step length strategy reduces the number of iterations of the algorithm and the time for path planning. Finally, to prevent sudden changes in speed during the operation of the robotic arm, a path optimization method is proposed to prune the path, eliminating redundant nodes in the generated path while using B-spline functions to optimize the final path. The present disclosure significantly improves search efficiency, search time, and the number of redundant nodes in the process of robotic arm path planning.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can still be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To make the above objectives, features, and advantages of the present disclosure clearer and more comprehensible, the present disclosure will be further described in detail below with reference to the accompanying drawings and the specific embodiments.

Figure 1:
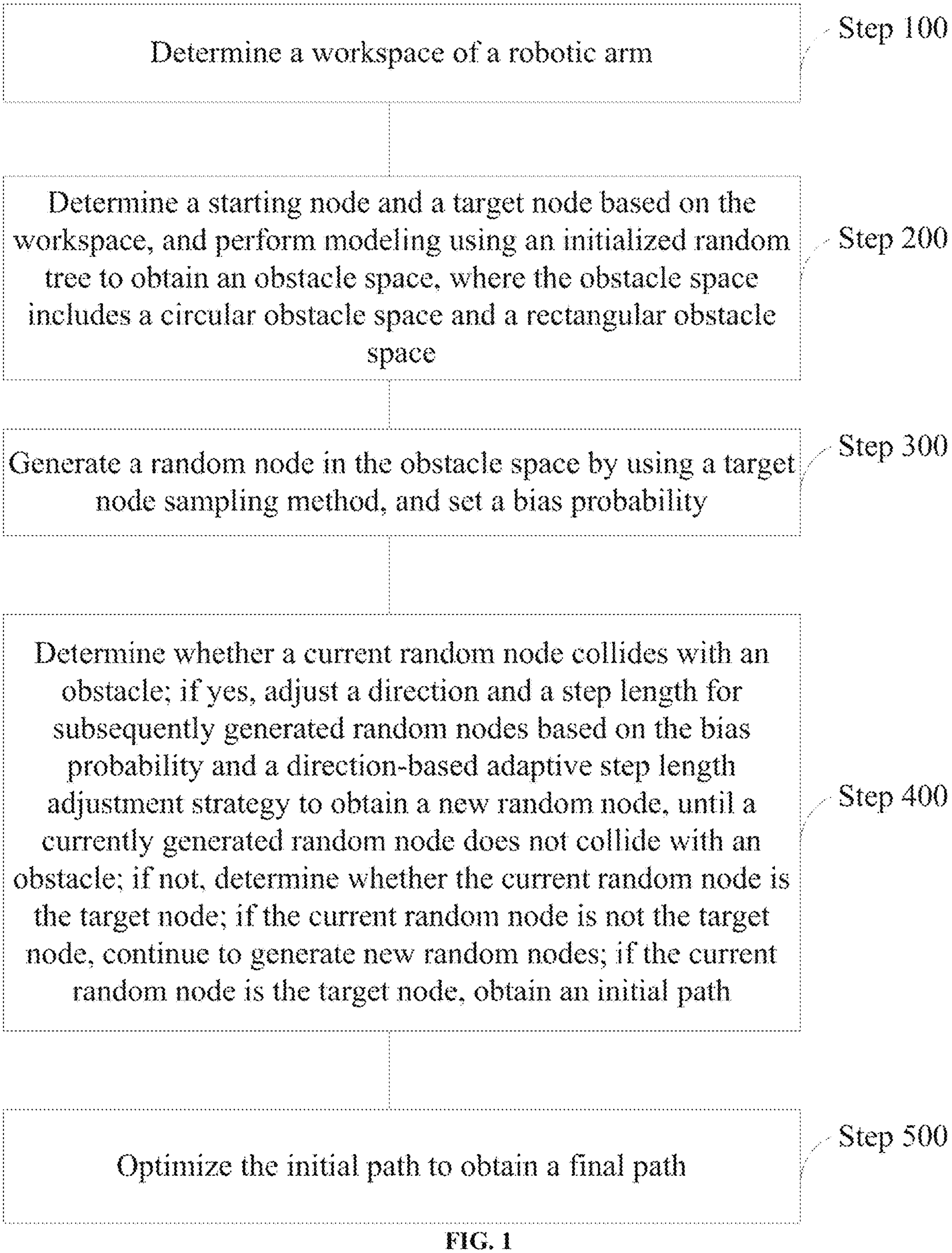
FIG. 1 is a flowchart of a robotic arm path planning method based on a directionally extended RRT algorithm according to an embodiment of the present disclosure.

As shown in FIG. 1, the present disclosure provides a robotic arm path planning method based on a directionally extended RRT algorithm, including the following steps:

Step 100: Determine a workspace of a robotic arm.

Step 200: Determine a starting node and a target node based on the workspace, and perform modeling using an initialized random tree to obtain an obstacle space, where the obstacle space includes a circular obstacle space and a rectangular obstacle space.

Specifically, a workspace of a six-degree-of-freedom robotic arm is constructed; a starting node and a target node are input, and a random tree is initialized to model obstacles in the space.

Step 300: Generate a random node in the obstacle space by using a target node sampling method, and set a bias probability.

Specifically, a target node sampling method is used for node selection. When a new random node is generated, a bias probability is set artificially.

More specifically, when a new random node $X_{new}$ is generated, a probability $P_0=0.6$ is set, so that the random tree sets the new node at the target node with a probability of $P_0$, where $P_0$ is the bias probability.

A random probability P is generated in the interval (0, 1). If P is less than or equal to $P_0$, a sampling node is directly generated at the target node, i.e., $X_{new}=X_{goal}$. If P is greater than $P_0$, the sampling node is still set as a random node. An expression for generating the sampling node is:

$$X_{node} = \begin{cases} X_{goal}, & \text{if } P < P_0 \\ X_{random}, & \text{otherwise} \end{cases}.$$

Step 400: Determine whether a current random node collides with an obstacle; if yes, adjust a direction and a step length for subsequently generated random nodes based on the bias probability and a direction-based adaptive step length adjustment strategy to obtain a new random node, until a currently generated random node does not collide with an obstacle; if not, determine whether the current random node is the target node; if the current random node is not the target node, continuing to generate new random nodes; if the current random node is the target node, obtain an initial path.

Specifically, a dynamic sampling strategy that integrates greedy ideas is designed to adjust the growth speed of the random tree in obstacle-free areas. In addition, a direction-based adaptive step length adjustment strategy is proposed. In the early stages of path planning, uniform sampling is employed to allow the algorithm to find an appropriate number of random nodes in the environment. After a collision occurs, the step length is adjusted and it is determined whether the random tree has reached the target node of the path. If not, sampling is continued in the space and the process returns to the step of "constructing the workspace of the six-degree-of-freedom robotic arm, inputting the starting node and the target node, and initializing the random tree to model the obstacles in the space." Otherwise, the next step is performed.

Specifically, a range of variation for the sampling area is configured such that $X_{new}$ is the center of a sampling circle with a radius R, where an expression for the radius of the sampling circle is:

$$R = L \times \left(\frac{|L - S_0|}{\lambda}\right).$$

When a new sampling node X is generated within the dynamic circle, a distance L to its nearest parent node X' and a step length S are determined. If L is greater than S, new nodes are searched for by continuously moving in the growth direction by the step length S until an obstacle is encountered. The range of variation for the sampling area is determined by a weight value λ, and an expression for the weight value λ is:

$$\lambda = P \times \left(\frac{N_1}{N_1 + N_2}\right)^{\gamma}$$

where $N_1$ denotes the number of sampling nodes for new child nodes that can be generated by the random tree; $N_2$ denotes the number of sampling nodes to be deleted that did not pass collision detection; γ denotes a sampling coefficient that determines changes in the weight value.

The concept of direction angle is introduced, an angle between a direction vector of $X_{near}$ and $X_{goal}$ and a direction vector of $X_{new}$ and $X_{goal}$ is set to be a direction angle θ. An angle threshold is set, to dynamically adjust the sampling step length based on the size of the angle between connection lines of the random tree. Spherical coordinates are used for analysis, where Cartesian coordinates of a node can be defined as coordinates $(r,\theta_1,\varphi)$ During generation of nodes, the path is directed from existing nodes on the random tree to a newly generated node. When preparing to connect a newly generated node Q to a sampling node P on the random tree, a certain distance and angle difference will occur, allowing the random tree to adjust the step length while changing the generation direction. Expressions for spherical coordinates and step length adjustment values are as follows:

$$\begin{cases} \Delta r = \sqrt{(x_2 - x_1)^2 + (y_2 - y_1)^2 + (z_2 - z_1)^2} \\ \Delta\theta_1 = \arccos\left(\dfrac{\overrightarrow{OP} \cdot \overrightarrow{OQ}}{|\overrightarrow{OP}| \cdot |\overrightarrow{OQ}|}\right) = \arccos\left(\dfrac{x_1x_2 + y_1y_2 + z_1z_2}{\sqrt{x_1^2 + y_1^2 + z_1^2} \cdot \sqrt{x_2^2 + y_2^2 + z_2^2}}\right) \\ \Delta\varphi = \varphi_2 - \varphi_1 \end{cases}$$

$$S = \begin{cases} \left(\dfrac{r + \Delta r}{r}\right) S_0, & \theta < \theta_t \\ NL_0[1 - \sin(\Delta\theta)] \cdot \cos(\Delta\varphi)\left(\dfrac{r}{r + \Delta r}\right), & \theta > \theta_t \end{cases}.$$

where N represents a step length adjustment coefficient; the node $X_{new}$ as the center and 1.5 L as the radius, a sphere is drawn, and a ratio of a total surface area of all obstacles within the sphere to a surface area of the sphere is expressed as follows:

$$N = \begin{cases} \dfrac{S_{obstacle}}{\pi \cdot L^2} \dfrac{(\Delta\theta_1 + \Delta\varphi)}{\pi} & R = 2 \\ \dfrac{S_{obstacle}}{4 \cdot \pi \cdot L^2} \dfrac{(\Delta\theta_1 + \Delta\varphi)}{\pi} & R = 3 \end{cases};$$

where $S_{obstacle}$ represents an area of the obstacle; for ease of calculation and to improve S the efficiency of the algorithm, a boundary value d of the obstacle is taken as two intersection points of the obstacle with the detection circle, namely, $x_0$ and $x_1$, which are expressed as follows:

$$S_{obstacle} = \begin{cases} \pi\tan^{-1}\dfrac{\|x_0x_1\|}{d}(1.5L)^2 - \dfrac{\|x_0x_1\|}{2}d & R = 2 \\ 4\pi\tan^{-1}\dfrac{\|x_0x_1\|^2}{d}(1.5L)^2 - \dfrac{\|x_0x_1\|}{2}d & R = 3 \end{cases}$$

Step 500: Optimize the initial path to obtain a final path.

Further, the step of determining the workspace of the robotic arm includes:

obtaining a transformation matrix based on working parameters of the robotic arm;

obtaining an end effector pose matrix based on the transformation matrix; and obtaining the workspace of the robotic arm by using a Monte Carlo method based on the end effector pose matrix.

Specifically, the robotic arm is modeled using a Denavit-Hartenberg (D-H) parameter method, establishing a spatial coordinate system at the end of each link. The D-H parameters of the robotic arm are shown in Table 1, which is a D-H parameter table for a six-degree-of-freedom robotic arm:

TABLE 1

D-H Parameter Table for Six-Degree-of-Freedom Robotic Arm

| Link | $a_i$ | $\alpha_i$ | $d_i$ | $\theta_i$ |
|---|---|---|---|---|
| 1 | $a_1$ | 90° | 0 | $\theta_1$ |
| 2 | $a_2$ | 0 | 0 | $\theta_2$ |
| 3 | $a_3$ | 90° | 0 | $\theta_3$ |
| 4 | 0 | −90° | $d_4$ | $\theta_4$ |
| 5 | 0 | 90° | 0 | $\theta_5$ |
| 6 | 0 | 0 | $d_6$ | $\theta_6$ |

The parameters include joint angles ($\alpha_i$), joint distances ($a_i$), link lengths ($d_i$), and link relative rotation angles ($\theta_i$). A matrix composed of the four parameters for each joint can be used to describe a relationship between two adjacent links of the joint. The transformation matrix is:

$$ {}^{i-1}_{i}T = \begin{bmatrix} ca_i & -s\theta_i ca_i & s\theta_i sa_i & \theta_i ca_i \\ s\theta_i & c\theta_i ca_i & -c\theta_i sa_i & a_i sa_i \\ 0 & sa_i & ca_i & d_i \\ 0 & 0 & 0 & 1 \end{bmatrix}; $$

Figure 2:
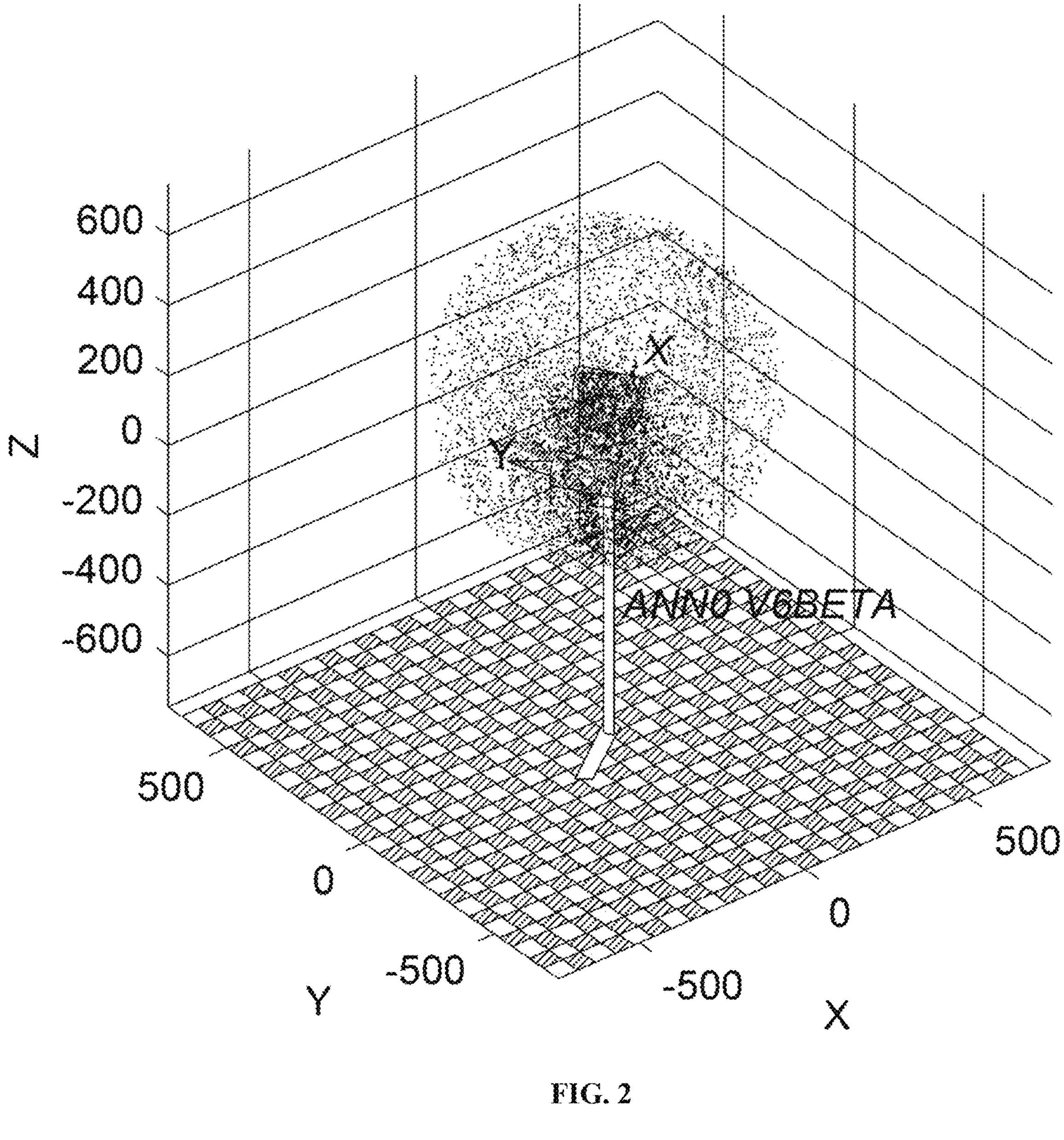
FIG. 2 is a schematic diagram of a workspace of a six-degree-of-freedom robotic arm according to an embodiment of the present disclosure.

Using six joint angles, a mathematical model of the robotic arm is established to solve for the end effector pose matrix. At the same time, the Monte Carlo method is used to obtain the workspace of the robotic arm (as shown in FIG. 2).

Furthermore, a coordinate system is established to describe the geometric characteristics of each part of the robot. A robotic arm model is created in MATLAB using the D-H parameters, and the accuracy of the pose of the end effector in different models is verified using the Robotic Toolbox for MATLAB. The six-degree-of-freedom robotic arm is analyzed using the D-H parameter method, which includes specific parameters such as joint angles ($\alpha_i$), joint distances ($a_i$), link lengths ($d_i$), and link relative rotation angles ($\theta_i$). According to the D-H parameter method, the matrix composed of the four parameters for each joint of the robot can be used to describe a relationship between two adjacent links of the joint. Based on the D-H parameters for each joint of the robotic arm, by substituting the four parameters into the transformation matrix, parameter matrices for each link are obtained. Then, 6 resulting matrices are multiplied sequentially to obtain parameter relationships between poses of the robotic arm. The end effector pose matrix is represented as follows:

$$ T_6^0 = \left[\prod_{i=1}^{6} {}^{i-1}T_i(\theta_i)\right] = \begin{bmatrix} n & s & a & p \\ 0 & 0 & 0 & 1 \end{bmatrix} = \begin{bmatrix} n_x & s_x & a_x & p_x \\ n_y & s_y & a_y & p_y \\ n_z & s_z & a_z & p_z \\ 0 & 0 & 0 & 1 \end{bmatrix}; $$

where three column vectors, namely, n, s, and a, represent a posture of the robotic arm; and p represents a position of a coordinate system origin of the end effector relative to a base coordinate system.

The Monte Carlo method is a numerical simulation method that treats probabilistic phenomena as research objects. By randomly selecting 10,000 poses of the robotic arm, an operable workspace of the robotic arm is obtained.

Further, the working parameters include:

joint angles, joint distances, link lengths, and link relative rotation angles.

Further, a method for determining obstacle collisions in the circular obstacle space is a spherical envelope method.

Specifically, a cylindrical envelope method is used to simplify the link model. Spherical obstacles in three-dimensional space are treated using the spherical envelope method, while rectangular obstacles are treated using an axis-aligned bounding box method. The collision detection of obstacles can be simplified to determining a distance between the center of the obstacle and the axis of the robotic arm.

Further, a method for determining obstacle collisions in the rectangular obstacle space is an axis-aligned bounding box method.

Further, the step of optimizing the initial path to obtain the final path includes:

deleting redundant nodes to obtain a relatively short path with a relatively small curvature and relatively few bends; and smoothing the currently generated path using a cubic B-spline curve to obtain the final path.

Further, a basis function of the B-spline curve is expressed as follows:

$$ P(t) = \sum_{i=0}^{n} P_i F_{i,k}(t); $$

where $P_i$ represents a control point of a curve to be optimized, and F represents a k-th order B-spline basis function.

Specifically, collision detection is performed on the paths between each node; redundant nodes are deleted to obtain a relatively short path with a relatively small curvature and relatively few bends. Starting from the starting node, all nodes are traversed again; a cubic B-spline curve is used for path smoothing.

A third-order B-spline function is expressed as follows:

$$ \begin{aligned} F_{0,3}(t) &= \frac{1}{6}(1-t)^3 \\ F_{1,3}(t) &= \frac{1}{6}\left(3t^3 - 6t^2 + 4\right) \\ F_{2,3}(t) &= \frac{1}{6}\left(-3t^3 + 3t^2 + +3t + 1\right) \\ F_{3,3}(t) &= \frac{1}{6}t^3 \end{aligned} . $$

Figure 3:
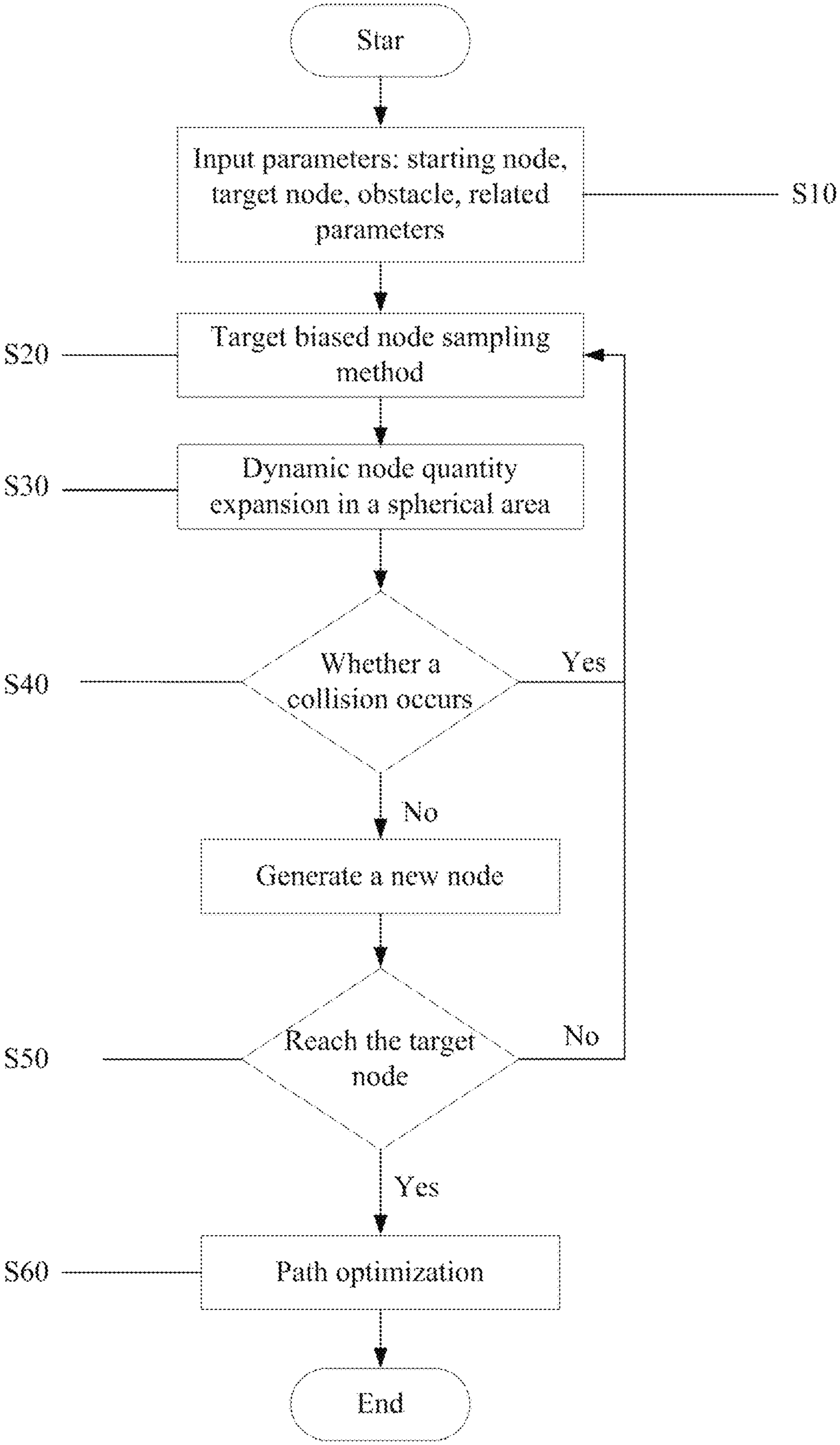
FIG. 3 is a flowchart of a directionally extended RRT algorithm according to an embodiment of the present disclosure.
Figure 4:
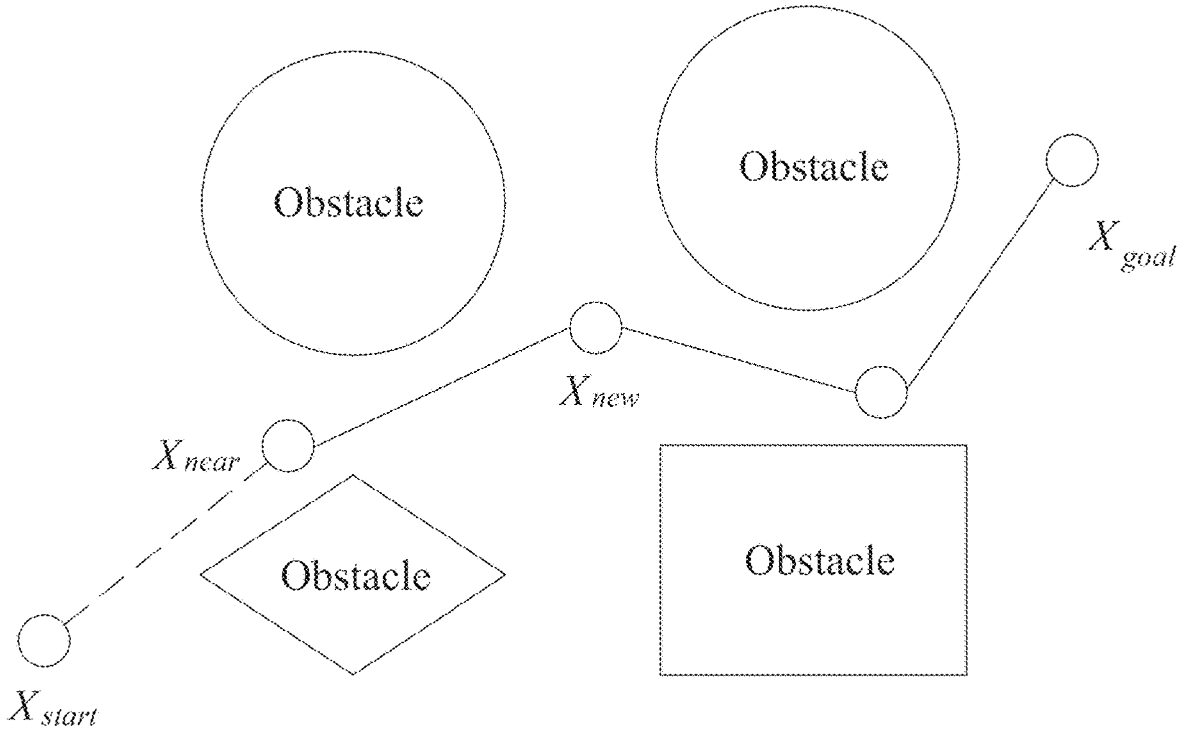
FIG. 4 is a diagram illustrating an RRT algorithm operation process in a robotic arm path planning algorithm based on a directionally extended RRT algorithm according to an embodiment of the present disclosure.

Further, as shown in FIG. 3 to FIG. 4, this embodiment also provides alternative steps of the robotic arm path planning method based on a directionally extended RRT algorithm:

Step 1: Construct a workspace of a six-degree-of-freedom robotic arm, input a starting node and a target node, and initialize a random tree to model obstacles in a space.

Step 2: Use a target node sampling method for node selection; when generating a new random node, artificially set a bias probability; set a probability $P_0$ based on a spatial distribution of obstacles, where when an obstacle space in a path planning space is a large-obstacle space containing numerous obstacles, $P_0$ is set to a larger value, and if the obstacle space is narrow and a node growth space is small, $P_0$ is set to a smaller value. At the same time, randomly generate a probability P in a range of 0 to 1, where when the random probability P is less than $P_0$, a target node is set to be a sampling node; when the random probability P is greater than $P_0$, the sampling node is still set as a random node.

Figure 5:
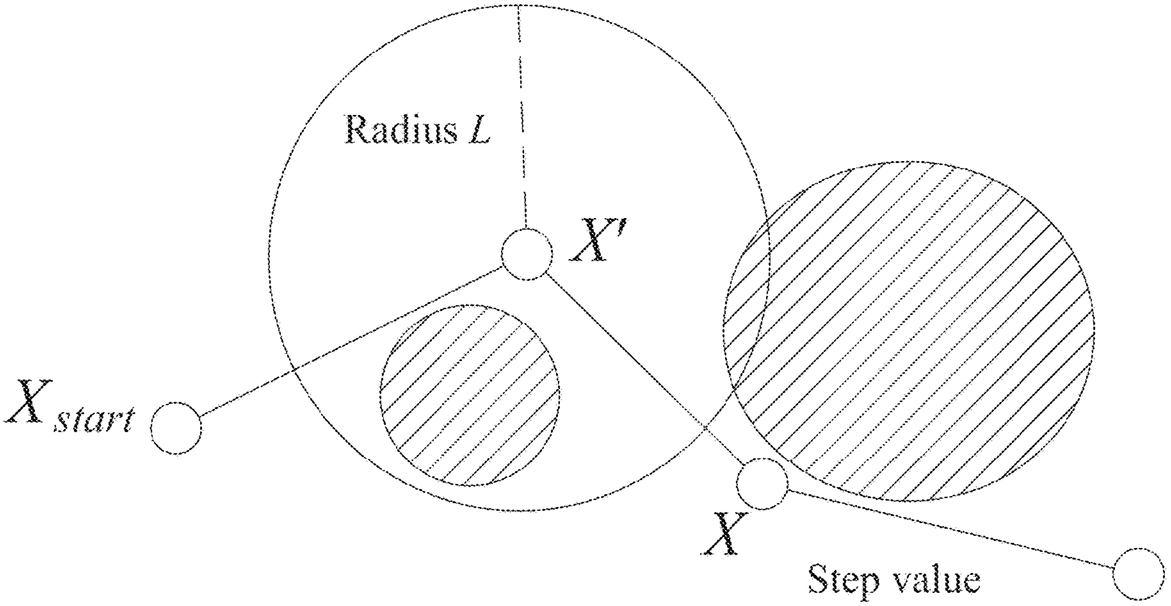
FIG. 5 is a principle diagram of a dynamic sampling process in the robotic arm path planning algorithm based on the directionally extended RRT algorithm according to an embodiment of the present disclosure.
Figure 6:
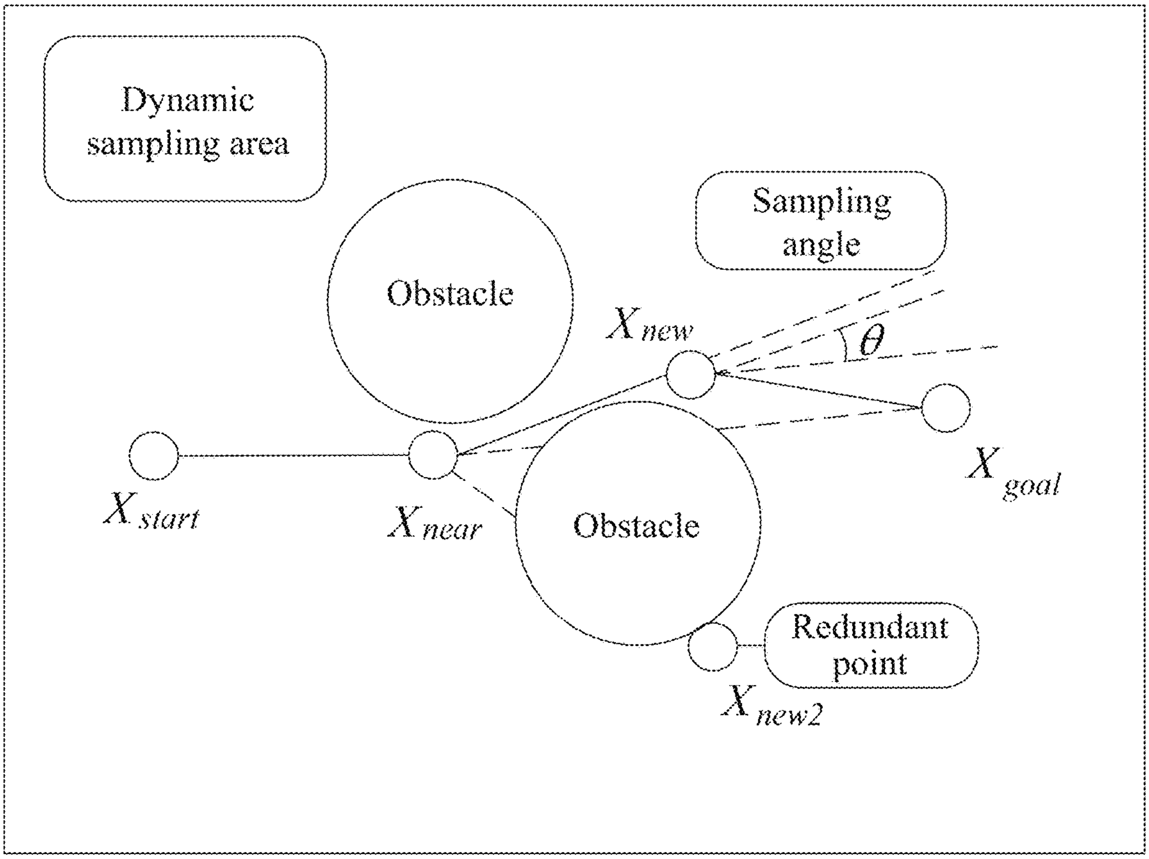
FIG. 6 is a principle diagram of angle extension in the robotic arm path planning algorithm based on the directionally extended RRT algorithm according to an embodiment of the present disclosure.
Figure 7:
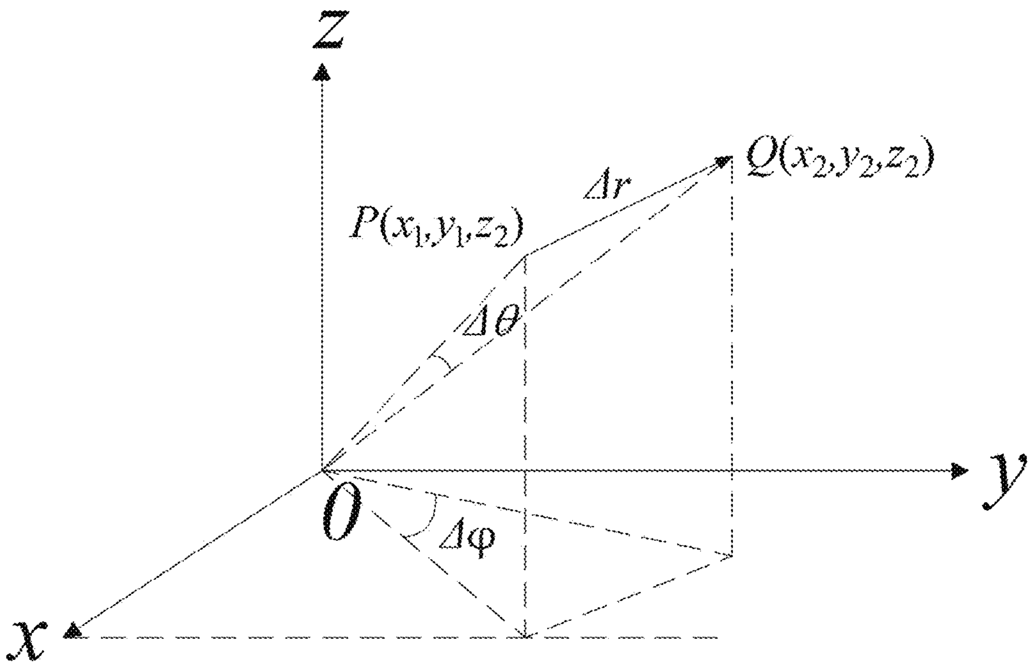
FIG. 7 is a principle diagram of generating sampling node directions in the robotic arm path planning algorithm based on the directionally extended RRT algorithm according to an embodiment of the present disclosure.

Step 3: As shown in FIG. 5, design a dynamic sampling strategy that integrates greedy ideas to adjust a growth speed of the random tree in obstacle-free areas; at the same time, as shown in FIG. 6 and FIG. 7, propose a direction-based adaptive step length adjustment strategy, where in early stages of path planning, uniform sampling is employed to allow the algorithm to find an appropriate number of random nodes in the environment, and after a collision occurs, a step length is adjusted.

Step 4: Simplify a link model by using a cylindrical envelope method. Spherical obstacles in three-dimensional space are treated using the spherical envelope method, while rectangular obstacles are treated using an axis-aligned bounding box method. The collision detection of obstacles can be simplified to determining a distance between the center of the obstacle and the axis of the robotic arm.

Step 5: Determine whether the random tree has reached a target node of a path; if not, continue sampling in the space and return to step 2; otherwise, proceed to the next step.

Figure 8:
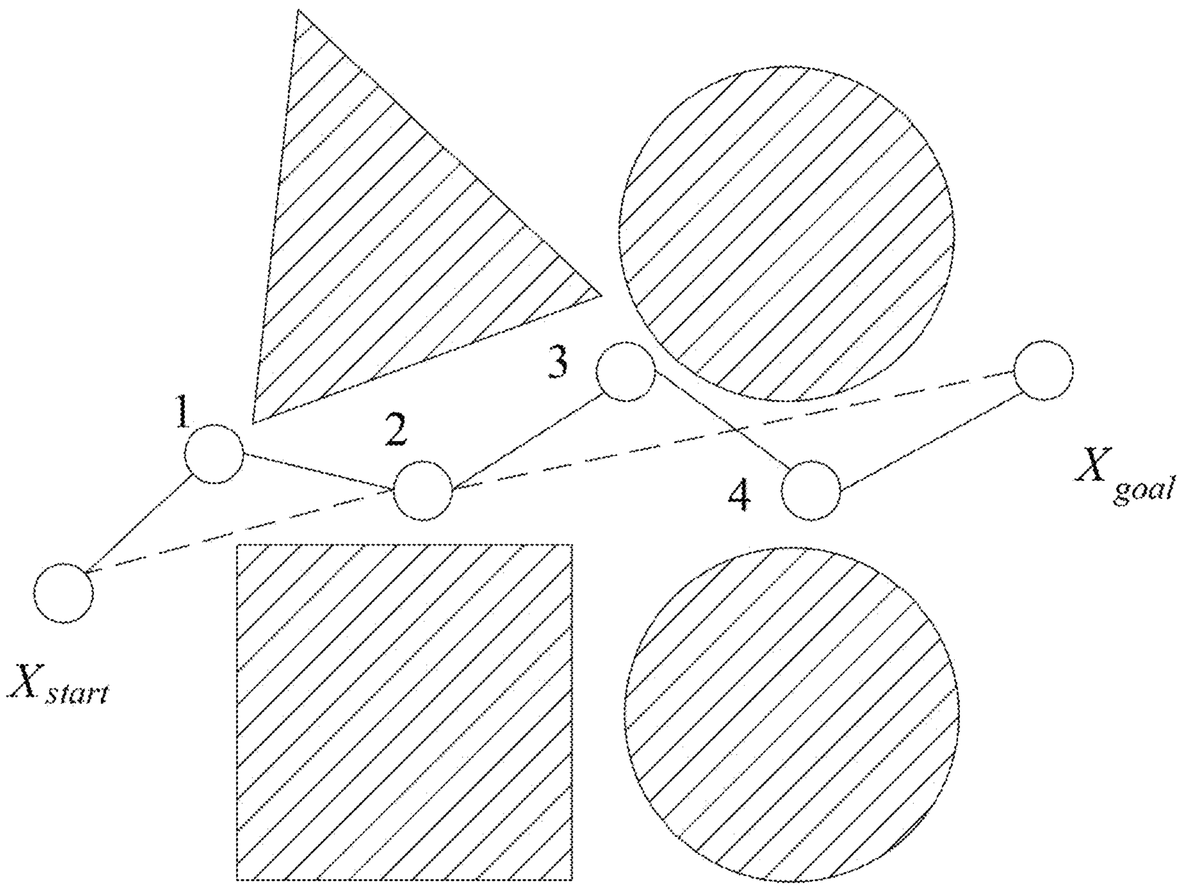
FIG. 8 is a diagram of path optimization processing in the robotic arm path planning algorithm based on the directionally extended RRT algorithm according to an embodiment of the present disclosure.
Figure 9:
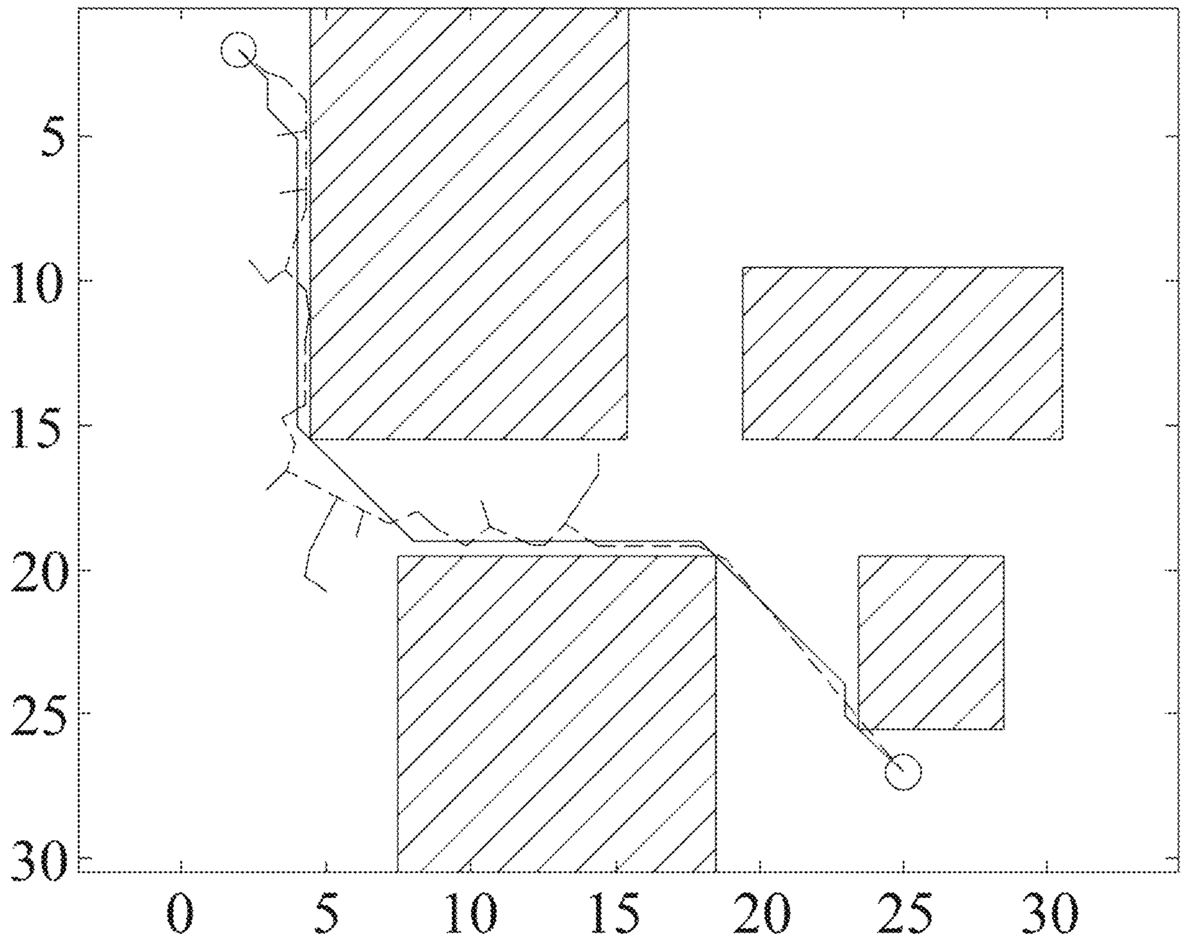
FIG. 9 is a diagram showing a path planning experiment obtained using a directionally extended RRT algorithm in a two-dimensional large-obstacle environment according to an embodiment of the present disclosure.
Figure 10:
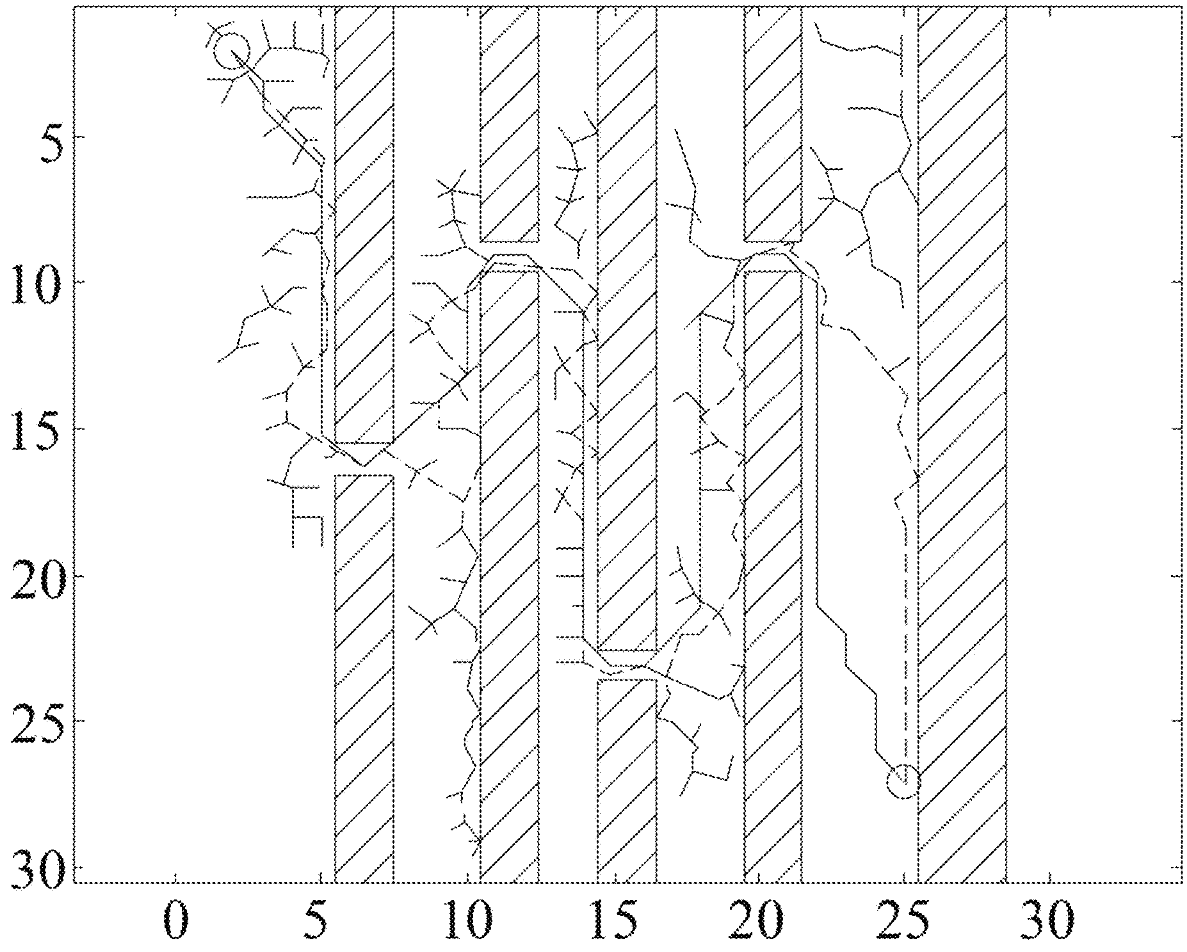
FIG. 10 is a diagram showing a path planning experiment obtained using a directionally extended RRT algorithm in a two-dimensional narrow obstacle environment according to an embodiment of the present disclosure.

Step 6: As shown in FIG. 8, delete redundant nodes from the generated path to obtain a relatively short path with a relatively small curvature and relatively few bends, and use a cubic B-spline curve for path smoothing. In FIG. 8 to FIG. 10, the graphics in shaded areas represent obstacles.

The present disclosure significantly accelerates the path generation speed and improves the convergence efficiency of the algorithm. The smoothing of the path reduces issues such as instability and sudden speed changes during the operation of the robotic arm. Using the aforementioned robotic arm path planning algorithm based on the directionally extended RRT algorithm, continuous path planning is performed 50 times in two-dimensional space, three-dimensional space, and the workspace of the robotic arm. The initial node $X_{start}$ is set to (2, 2), and the target node $X_{goal}$ is set to (27, 25). In the maze environment, the initial node $X_{start}$ is set to (10, 10), and the target node $X_{goal}$ is set to (100, 100). The initial value of the adaptive step length S is set to 1, the weight value is 0.8, $P_0$=0.5, and V=2. In the large-obstacle space, the angle threshold is set to 65°, while in the narrow space and maze space, the angle threshold is set to 45°. A collision-free path from $X_{start}$ to $X_{goal}$ is planned using the directionally extended RRT algorithm. The directionally extended RRT algorithm is compared with the RRT and goal-biased rapidly-exploring random tree (GB-RRT) algorithms, and results are as follows:

In the experiment of the robotic arm path planning algorithm based on the directionally extended RRT algorithm in a two-dimensional large-obstacle space (as shown in FIG. 9), the average time is 0.14 s, the average number of nodes is 48.72, and the average path length is 43.30. The comparison results are shown in Table 2, which is the simulation data table for the two-dimensional large-obstacle environment:

TABLE 2

Simulation Data Table for Two-Dimensional Large-Obstacle Environment

| Path planning algorithm | Average time | Average number of nodes | Path length |
|---|---|---|---|
| RRT | 2.17 | 221.70 | 48.21 |
| GB-RRT | 1.04 | 85.60 | 44.89 |
| Directionally extended RRT | 0.14 | 48.72 | 43.30 |

From the simulation data of the two-dimensional large-obstacle environment, it can be seen that the average running time and average number of sampling nodes of the directionally extended RRT algorithm have also significantly decreased. The average running time is 87% and 94% faster than RRT and GB-RRT, respectively, and the average number of sampling nodes is 78% and 43% less than the two algorithms.

In the experiment of the two-dimensional narrow obstacle space (as shown in FIG. 10), the average time is 4.41 s, the average number of nodes is 1416.48, and the average path length is 94.20. The comparison results are shown in Table 3, which is the simulation data table for the two-dimensional narrow obstacle environment:

TABLE 3

Simulation Data Table for Two-Dimensional Narrow Obstacle Environment

| Path planning algorithm | Average time | Average number of nodes | Path length |
|---|---|---|---|
| RRT | 27.75 | 2926.24 | 100.24 |
| GB-RRT | 8.51 | 2971.46 | 97.86 |
| Directionally extended RRT | 4.41 | 1416.48 | 94.20 |

From the simulation data of the two-dimensional narrow obstacle environment, it can be seen that the directionally extended RRT algorithm reduces the average running time, sampling path length, and average sampling nodes by 84%, 6%, and 52%, respectively, compared to the standard RRT algorithm. Compared to the GB-RRT algorithm, the directionally extended RRT algorithm reduces the average running time, sampling path length, and average sampling nodes by 48%, 4%, and 49%, respectively.

Figure 11:
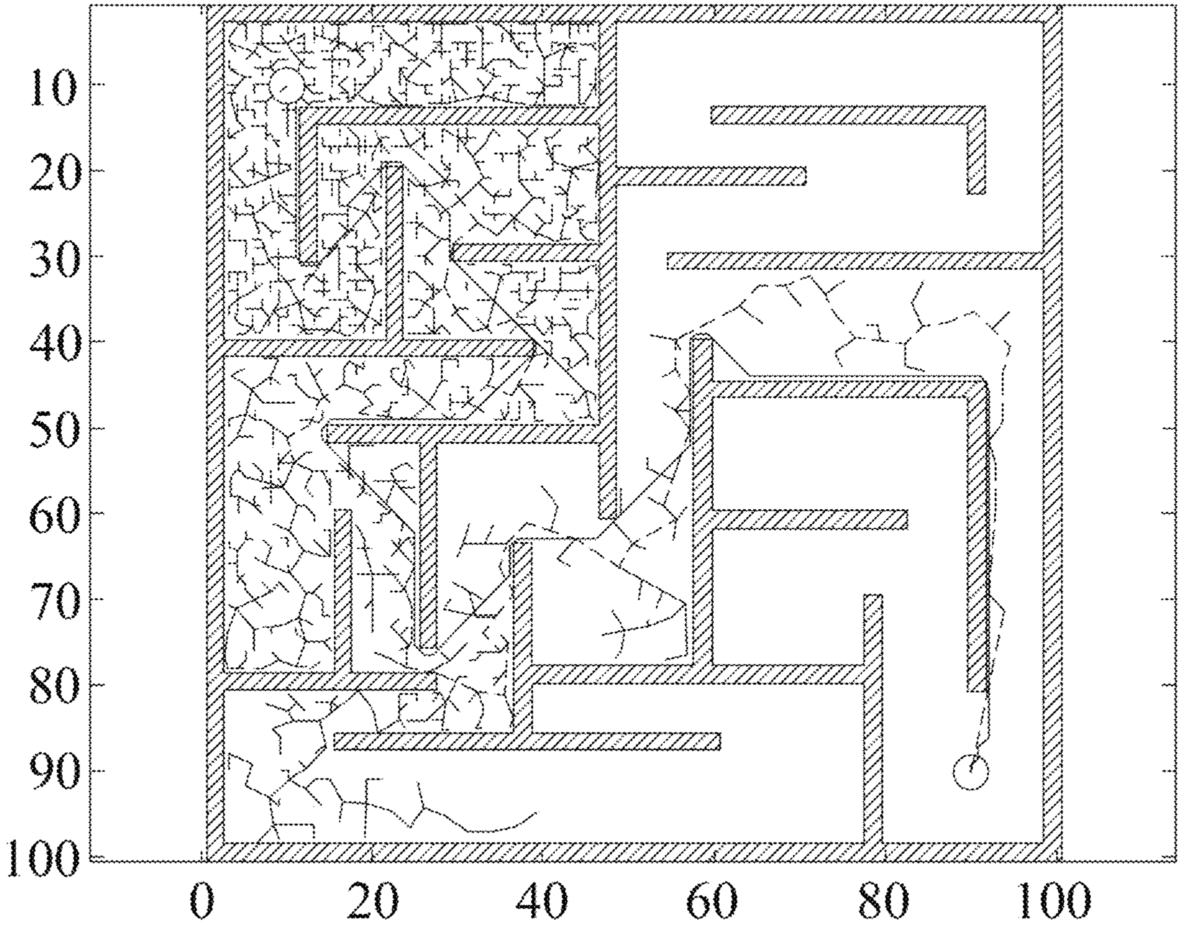
FIG. 11 is a diagram showing a path planning experiment obtained using a directionally extended RRT algorithm in a two-dimensional maze environment according to an embodiment of the present disclosure.

In the experiment of the two-dimensional maze obstacle space (as shown in FIG. 11), the average time is 9.76 s, the average number of nodes is 2595.04, and the average path length is 266.31. The comparison results are shown in Table 4, which is the simulation data table for the two-dimensional maze obstacle environment:

TABLE 4

Simulation Data Table for Two-Dimensional Maze Environment

| Path planning algorithm | Average time | Average number of nodes | Path length |
|---|---|---|---|
| Standard RRT | 52.94 | 5381.38 | 398.43 |
| GB-RRT | 12.84 | 3595.90 | 353.68 |
| Directionally extended RRT | 9.76 | 2595.04 | 266.31 |

From the simulation data of the two-dimensional maze obstacle environment, it can be seen that the directionally extended RRT algorithm reduces the average running time, and average sampling nodes, and sampling path length by 82%, 52%, and 33%, respectively, compared to the RRT algorithm. Compared to the GB-RRT algorithm, the directionally extended RRT algorithm reduces the average running time, sampling path length, and average sampling nodes by 24%, 28%, and 25%, respectively.

Figure 12:
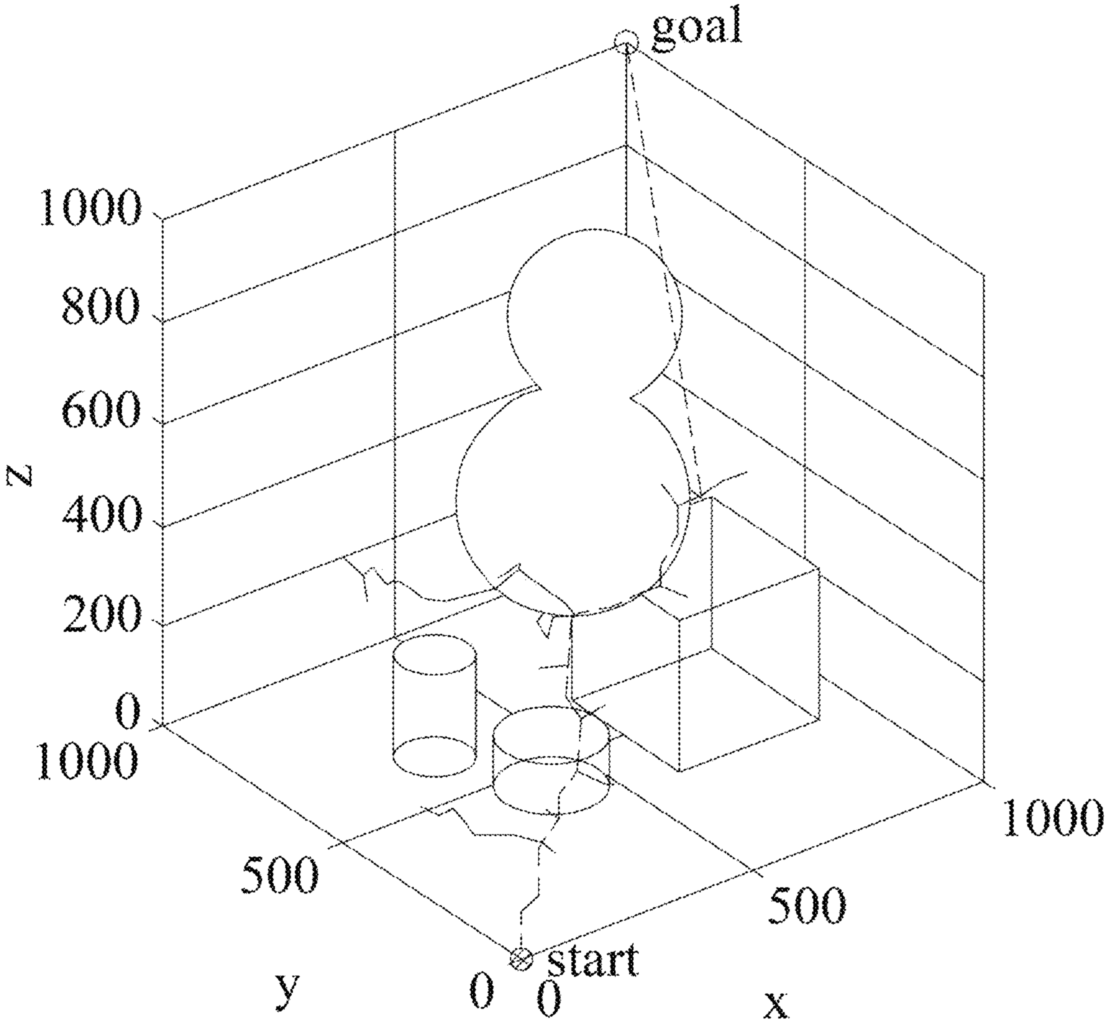
FIG. 12 is a diagram showing a path planning experiment obtained using a directionally extended RRT algorithm in a three-dimensional large-obstacle environment according to an embodiment of the present disclosure.

In the experiment of the three-dimensional large-obstacle space (as shown in FIG. 12), the average time is 1.28 s, the average number of nodes is 813.34, and the average path length is 1883.45. The comparison results are shown in Table 5, which is the simulation data table for the three-dimensional large-obstacle environment:

TABLE 5

Simulation Data Table for Three-Dimensional Large-Obstacle Environment

| Path planning algorithm | Average time | Average number of nodes | Path length |
|---|---|---|---|
| Standard RRT | 5.53 | 2778.24 | 2421.23 |
| GB-RRT | 1.45 | 850.46 | 1899.34 |
| Directionally extended RRT | 1.28 | 813.34 | 1883.45 |

From the simulation data of the three-dimensional large-obstacle environment, it can be seen that the directionally extended RRT algorithm reduces the average time, average number of nodes, and average path length by 77%, 71%, and 22%, respectively, compared to the RRT algorithm, and by 12%, 4%, and 1%, respectively, compared to the GB-RRT algorithm.

Figure 13:
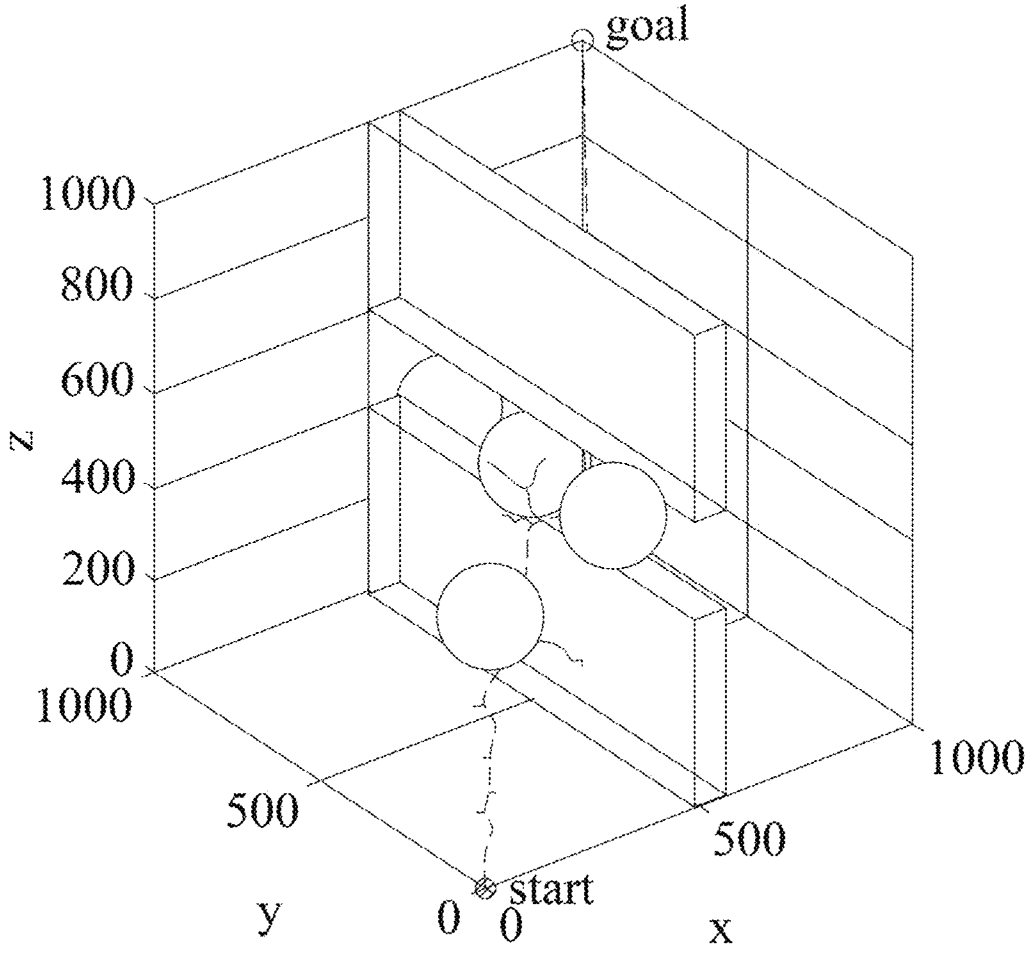
FIG. 13 is a diagram showing a path planning experiment obtained using a directionally extended RRT algorithm in a three-dimensional narrow obstacle environment according to an embodiment of the present disclosure.

In the experiment of the three-dimensional narrow obstacle space (as shown in FIG. 13), the average time is 0.27 s, the average number of nodes is 932.87, and the average path length is 1986.73. The comparison results are shown in Table 6, which is the simulation data table for the three-dimensional narrow obstacle environment:

TABLE 6

Simulation Data Table for Three-Dimensional Narrow Obstacle Environment

| Path planning algorithm | Average time | Average number of nodes | Path length |
|---|---|---|---|
| Standard RRT | 6.21 | 2845.34 | 2363.84 |
| GB-RRT | 1.15 | 945.23 | 1988.15 |
| Directionally extended RRT | 0.27 | 932.87 | 1986.73 |

From the simulation data of the three-dimensional narrow obstacle environment, it can be seen that the directionally extended RRT algorithm reduces the average time, average number of nodes, and average path length by 96%, 67%, and 16%, respectively, compared to the RRT algorithm. Compared to the GB-RRT algorithm, the directionally extended RRT algorithm reduces the time by 0.88 s, the number of nodes by 12.36, and the path length by 1.42.

Figure 14:
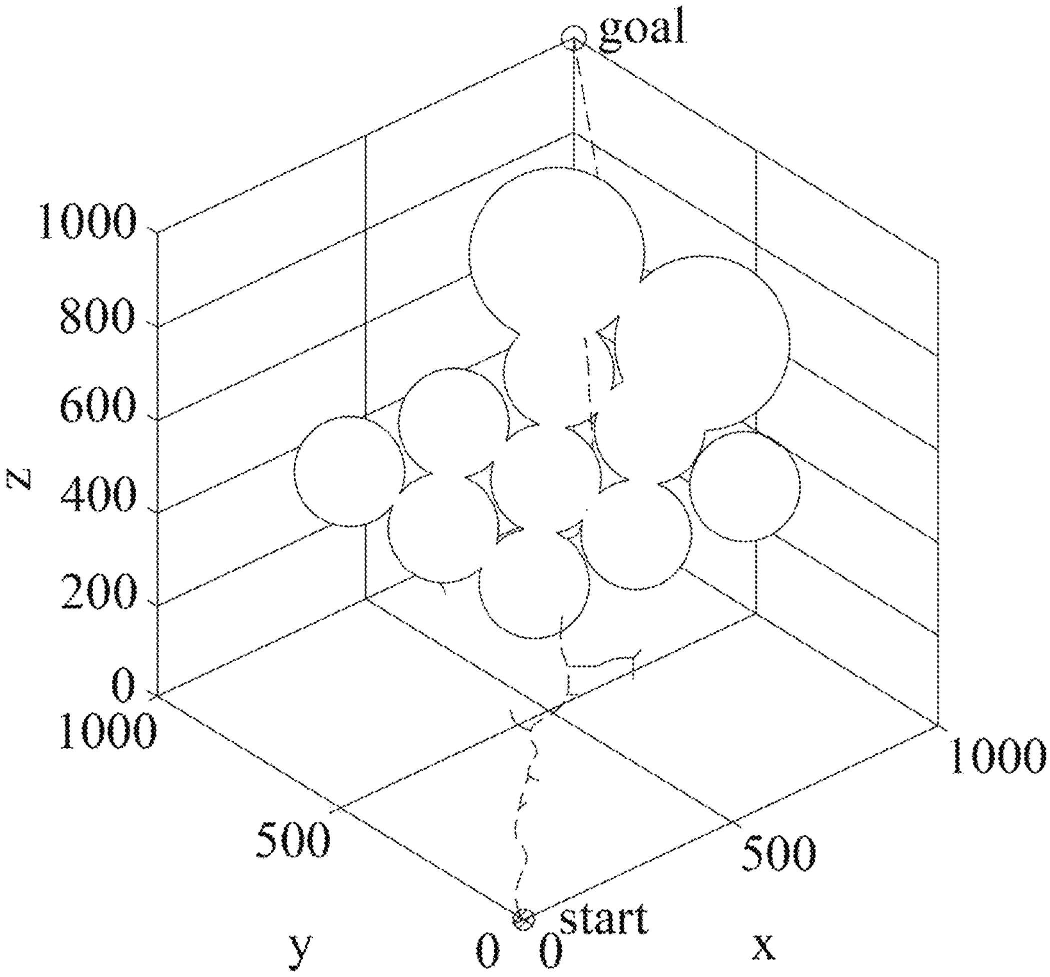
FIG. 14 is a diagram showing a path planning experiment obtained using a directionally extended RRT algorithm in a three-dimensional multi-obstacle environment according to an embodiment of the present disclosure.

In the experiment of the three-dimensional multi-obstacle space (as shown in FIG. 14), the average time is 3.82 s, the average number of nodes is 842.32, and the average path length is 2039.74. The comparison results are shown in Table 7, which is the simulation data table for the three-dimensional multi-obstacle environment:

TABLE 7

Simulation Data Table for Three-Dimensional Multi-Obstacle Environment

| Path planning algorithm | Average time | Average number of nodes | Path length |
|---|---|---|---|
| Standard RRT | 11.10 | 1932.31 | 2539.23 |
| GB-RRT | 4.42 | 1432.46 | 2213.32 |
| Directionally extended RRT | 3.82 | 842.32 | 2039.74 |

From the simulation data of the three-dimensional multi-obstacle environment, it can be seen that the directionally extended RRT algorithm reduces the average time, average number of nodes, and average path length by 66%, 56%, and 20%, respectively, compared to the RRT algorithm, and by 14%, 41%, and 8%, respectively, compared to the GB-RRT algorithm.

In the workspace experiment of the robotic arm, continuous path planning experiments were conducted 50 times. The robotic arm model was imported into MoveIt! to build a simulation experiment platform for the robotic arm. The simulation platform, which uses RVIZ for visualization, imported the directionally extended RRT algorithm and the GB-RRT algorithm into the Open Motion Planning Library (OMPL) for sampling comparison experiments in joint space.

In the robotic arm large-obstacle path planning experiment, the average time is 1.23 s, and the average number of nodes is 796. The comparison results are shown in Table 8, which is the simulation data table for the robotic arm large-obstacle environment:

TABLE 8

Simulation Data Table for Robotic Arm Large-Obstacle Environment

| Path planning algorithm | Average time | Average number of nodes |
|---|---|---|
| Standard RRT | 10.43 | 1932 |
| GB-RRT | 1.42 | 893 |
| Directionally extended RRT | 1.23 | 796 |

From the simulation data of the robotic arm large-obstacle environment, it can be seen that the directionally extended RRT algorithm reduces the average time by 88% and the average number of nodes by 59% compared to the basic RRT algorithm, and reduces the time by 0.19 s and the number of nodes by 97 compared to the GB-RRT algorithm.

In the robotic arm narrow obstacle path planning experiment, the average time is 1.29 s, and the average number of nodes is 632. The comparison results are shown in Table 9, which is the simulation data table for the robotic arm narrow obstacle environment:

TABLE 9

Simulation Data Table for Robotic Arm Narrow Obstacle Environment

| Path planning algorithm | Average time | Average number of nodes |
|---|---|---|
| Standard RRT | 12.49 | 2031 |
| GB-RRT | 6.34 | 873 |

TABLE 9-continued

| Simulation Data Table for Robotic Arm Narrow Obstacle Environment | | |
|---|---|---|
| Path planning algorithm | Average time | Average number of nodes |
| Directionally extended RRT | 1.29 | 632 |

From the simulation data of the robotic arm narrow environment, it can be seen that the directionally extended algorithm reduces the average time by 90% and the average number of nodes by 69% compared to the basic RRT algorithm, and it has significantly fewer nodes compared to the GB-RRT algorithm.

In the robotic arm multi-obstacle path planning experiment, the average time is 0.98 s, and the average number of nodes is 986. The comparison results are shown in Table 10, which is the simulation data table for the robotic arm multi-obstacle environment:

TABLE 10

| Simulation Data Table for Robotic Arm Multi-Obstacle Environment | | |
|---|---|---|
| Path planning algorithm | Average time | Average number of nodes |
| Standard RRT | 19.82 | 3001 |
| GB-RRT | 5.13 | 1039 |
| Directionally extended RRT | 0.98 | 986 |

From the simulation data of the robotic arm multi-obstacle environment, it can be seen that the directionally extended algorithm reduces the time by 18.84 s and the number of nodes by 2015 compared to the basic RRT algorithm. Compared to the target bias RRT, it reduces the time by 4.15 s and the number of nodes by 53. The improved algorithm shows significant advantages in multi-obstacle spaces.

These data are sufficient to demonstrate that the directionally extended RRT algorithm has strong planning and adaptability in different complex spaces.

Each embodiment in the description is described in a progressive mode, each embodiment focuses on differences from other embodiments, and references can be made to each other for the same and similar parts between embodiments.

Specific examples are used herein for illustration of the principles and embodiments of the present disclosure. The description of the foregoing embodiments is used to help understand the method of the present disclosure and the core principles thereof. In addition, those of ordinary skill in the art can make various modifications in terms of specific embodiments and scope of application in accordance with the teachings of the present disclosure. In conclusion, the content of the description shall not be construed as limitations to the present disclosure.

What is claimed:

1. A robotic arm path planning method based on a Direction Extended Rapidly-exploring Random Tree (RRT) algorithm, comprising:

determining a workspace of a robotic arm;

determining a starting node and a target node based on the workspace, and performing modeling using an initialized random tree to obtain an obstacle space, wherein the obstacle space comprises a circular obstacle space and a rectangular obstacle space;

generating a random node in the obstacle space by using a target node sampling method, wherein the target node sampling method comprises setting a bias probability $P_0$ based on a spatial distribution of obstacles, randomly generating a probability P in a range of 0 to 1, setting the target node as a sampling node when P is less than or equal to $P_0$, and setting the sampling node as a random node when P is greater than $P_0$;

determining whether a current random node collides with an obstacle;

in response to a determination that the current random node collides with the obstacle, adjusting a direction and a step length for subsequently generated random nodes based on the bias probability and a direction-based adaptive step length adjustment strategy to obtain a new random node, until a currently generated random node does not collide with an obstacle, wherein the direction-based adaptive step length adjustment strategy comprises setting a direction angle θ between a direction vector from $X_{near}$ to $X_{goal}$ and a direction vector from $X_{new}$ to $X_{goal}$, setting an angle threshold, and dynamically adjusting a sampling step length based on the direction angle θ;

in response to a determination that the current random node does not collide with the obstacle:

determining whether the current random node is the target node;

in response to determining the current random node is not the target node, continuing to generate new random nodes; and in response to determining the current random node is the target node, obtaining an initial path; and optimizing the initial path to obtain a final path.

2. The method according to claim 1, wherein said determining the workspace of the robotic arm comprises:

obtaining a transformation matrix based on working parameters of the robotic arm;

obtaining an end effector pose matrix based on the transformation matrix; and obtaining the workspace of the robotic arm by using a Monte Carlo method based on the end effector pose matrix.

3. The method according to claim 2, wherein the working parameters comprise joint angles, joint distances, link lengths, and link relative rotation angles.

4. The method according to claim 1, further comprising:

using a spherical envelope method to determine obstacle collisions in the circular obstacle space.

5. The method according to claim 1, further comprising:

using an axis-aligned bounding box method to determine obstacle collisions in the rectangular obstacle space.

6. The method according to claim 1, wherein the optimizing the initial path to obtain the final path comprises:

deleting redundant nodes to obtain a relatively short path with a relatively small curvature and relatively few bends; and smoothing the currently generated path using a cubic B-spline curve to obtain the final path.

7. The method according to claim 6, wherein a basis function of the B-spline curve is expressed as follows:

$$P(t)=\sum_{i=0}^{n} P_i F_{i,k}(t);$$

wherein $P_i$ represents a control point of a curve to be optimized, and F represents a k-th order B-spline basis function.

* * * * *